United States Patent
Keane et al.

(10) Patent No.: US 10,002,336 B2
(45) Date of Patent: *Jun. 19, 2018

(54) VISUALIZERS FOR CHANGE MANAGEMENT SYSTEM

(71) Applicant: Microsoft Technology Licensing, LLC, Redmond, WA (US)

(72) Inventors: Thomas Keane, Seattle, WA (US); Marisol Ontaneda, Kirkland, WA (US); Thomas N. Martino, Everett, WA (US); Nigel Graham Cain, Kinross (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/034,032

(22) Filed: Sep. 23, 2013

(65) Prior Publication Data

US 2014/0019192 A1    Jan. 16, 2014

Related U.S. Application Data

(63) Continuation of application No. 11/840,412, filed on Aug. 17, 2007, now Pat. No. 8,543,443.

(51) Int. Cl.
*G06Q 10/00* (2012.01)
*G06Q 10/06* (2012.01)

(52) U.S. Cl.
CPC ......... *G06Q 10/0633* (2013.01); *G06Q 10/06* (2013.01)

(58) Field of Classification Search
CPC .............................. G06Q 10/00; G06Q 30/02
USPC ............................................... 705/7.11–7.42
See application file for complete search history.

(56) References Cited

U.S. PATENT DOCUMENTS

| | | | |
|---|---|---|---|
| 5,835,898 A | | 11/1998 | Borg et al. |
| 6,240,421 B1 * | | 5/2001 | Stolarz |
| 6,321,204 B1 | | 11/2001 | Kazami et al. |
| 6,480,955 B1 | | 11/2002 | DeKoning et al. |
| 7,747,684 B2 * | | 6/2010 | Karube et al. ................. 709/204 |
| 7,925,985 B2 * | | 4/2011 | Moore ............... G05B 23/0267 715/772 |
| 2004/0143811 A1 | | 7/2004 | Kaelicke et al. |
| 2005/0138150 A1 | | 6/2005 | Sapan et al. |
| 2005/0138014 A1 | | 11/2005 | Sapan et al. |
| 2005/0256961 A1 | | 11/2005 | Roee et al. |
| 2006/0075387 A1 | | 4/2006 | Martin et al. |
| 2006/0161879 A1 | | 7/2006 | Lubrecht et al. |
| 2006/0168557 A1 | | 7/2006 | Hiralal et al. |

(Continued)

OTHER PUBLICATIONS

"IBM Tivoli Service Desk" IBM Corporation, 2006, pp. 1-8.

(Continued)

*Primary Examiner* — David Rines (57) ABSTRACT

A change management system may use a phased status indicator that may illustrate several phases of a change request and a current status for each phase of a change management lifecycle. Additionally, a group of change requests may be displayed in a linked manner showing various relationships between change requests. The status indicator and linked display may be used together or separately to illustrate the status of various change requests and within interactive displays of change request data.

20 Claims, 6 Drawing Sheets

(56) References Cited

U.S. PATENT DOCUMENTS

2007/0073778 A1    3/2007  Simmons
2007/0192715 A1    8/2007  Kataria et al.

OTHER PUBLICATIONS

Dirig et al, "BMC Remedy IT Service Management v7 Overview", Sep. 8, 2006, BMC Software, pp. 1-4.
"Magic Change Management", Magic Solutions, BMC Software, pp. 1-6.
"HP OpenView Service Desk Process—Insight 2.10 Software", Dec. 2, 2006, Hewlett-Packard Development Company, pp. 1-8.
Non-Final Office Action, U.S. Appl. No. 11/840,412, dated Mar. 4, 2011, pp. 13.
Final Office Action, U.S. Appl. No. 11/840,412, dated Aug. 19, 2011, pp. 15.
Non-Final Office Action, U.S. Appl. No. 11/840,412, dated Aug. 9, 2012, pp. 19.
Notice of Allowance, U.S. Appl. No. 11/840,412, dated May 21, 2013, pp. 14.

\* cited by examiner

VISUALIZERS FOR CHANGE MANAGEMENT SYSTEM

CROSS REFERENCE TO RELATED APPLICATIONS

This application claims the benefit of and priority to U.S. patent application Ser. No. 11/840,412, entitled "Visualizers For Change Management System", filed Aug. 17, 2007 by Thomas Keane et al., the entire contents of which are expressly incorporated by reference.

BACKGROUND

Change management systems may be used by Information Technology departments to track various modifications, upgrades, or changes to many different components within an information technology infrastructure. Because many components are interrelated with each other, changes that are deployed in an information technology infrastructure may have many interrelated effects that may be related to other changes.

Many change management systems may use a change request or other vehicle for proposing, approving, and implementing changes. A process for handling change requests may be defined to progress through various stages, and during each stage, the change request may have different states.

As change management systems are deployed, the quantity of change requests may produce large amounts of data. These data may be difficult to quickly comprehend and visualize when presented in tabular or columnar formats.

SUMMARY

A change management system may use a status indicator to illustrate the lifecycle phases of a change request and the status of an individual change request in that lifecycle. Additionally, a group of change requests may be displayed in a linked manner showing various relationships between change requests. The status indicator and linked display may be used together or separately to illustrate the status of various change requests and within interactive displays of change request data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Visualization tools within a change management system may be used to instantly convey the status of a change request as well as view interrelated change requests. Such tools may be used in many different areas, such as interactive displays within a change management system as well as email or other items that contain change management information.

The status of a single change request may be illustrated by a series of icons that represent the lifecycle of a change request. Each icon may have a status indicator that may visually show the status of the change request. Since the change request may have a current phase and status, an icon representing a completed stage or a stage yet to be completed may be shown with the current status of the current phase icon. Completed and future stages may be illustrated with grayed-out icons or icons with a different color to differentiate from the current phase and status.

The change request status indicator may be presented any place a change request may be referenced. For example, a list of existing change requests may be shown in tabular form with multiple change requests and their corresponding icons. References to change requests in documents or emails may include a status indicator.

In some cases, a status indicator may be interactive, allowing a user to mouse over, click on, right click, or otherwise interact with the status indicator to perform certain functions that may be available or to display underlying data or for other actions.

The status of multiple change requests may be illustrated by showing various change requests and relationships between the change requests. The relationships may be one way or two way relationships between change requests, in addition to sequential, parallel, peer to peer, parent/child, or other relationships. In some cases, such a display may be interactive, enabling a user to view, edit, or otherwise interact with change requests or relationships as independent entities or as groups of entities.

Specific embodiments of the subject matter are used to illustrate specific inventive aspects. The embodiments are by way of example only, and are susceptible to various modifications and alternative forms. The appended claims are intended to cover all modifications, equivalents, and alternatives falling within the spirit and scope of the invention as defined by the claims.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

Figure 1:
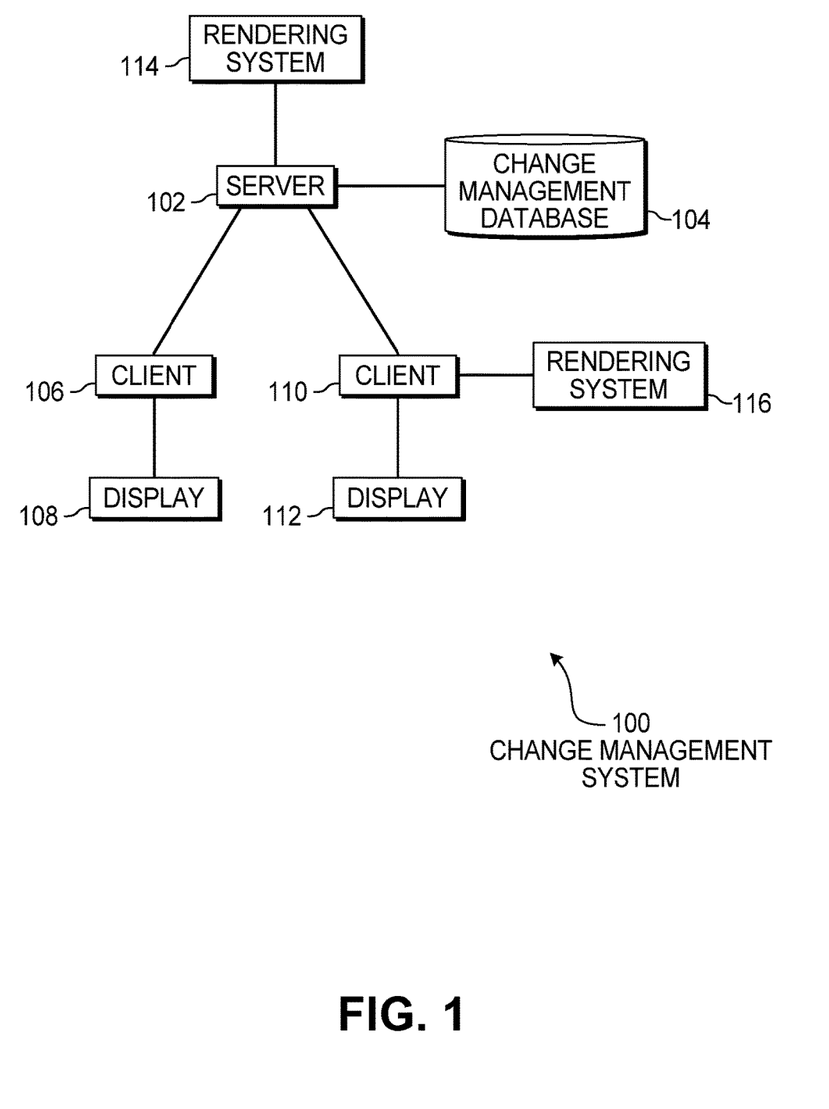
FIG. 1 is a diagram illustration of an embodiment showing a change management system.

FIG. 1 is a diagram of an embodiment 100 showing a change management system. Embodiment 100 may be used to manage changes in an information technology or other application, such as engineering change management for product development, project change management for civil engineering or construction projects, management of legislative or rule making processes, or other uses for change management processes. For the purposes of example, a change management process for information technology will be discussed throughout this specification, but any references to such a system shall be taken as exemplary and not as limiting.

A change management system may be used to create change requests, approve change requests, manage changes during implementation, and provide for review of completed changes. In many cases, change requests may be linked together. For example, a sequential relationship may be defined between two change requests so that one change request is implemented before another.

In large systems where many changes are managed, the number of change requests may be very large. In order to effectively communicate change request status and the interrelationships between change requests, various visual representations may be used. One example may be a set of sequential status icons that are arranged in order of phases of a lifecycle of a change request. Each of the icons may represent one phase of the lifecycle and may have an indicator for the current status within the phase. Such a visual representation may help a user quickly grasp the current status for an individual change request.

Another example of a visual representation may be a graphical view of change requests and the relationships between change requests. Multiple change requests may be viewed in such a representation, and, in some cases, interactive features on the representation may enable a user to perform various actions directly from the visual representation. Examples of such actions may be to display additional details, edit underlying data, or other functions.

The change management system of embodiment 100 may be configured in many different manners. In the embodiment 100, a client server architecture is illustrated that includes a server 102 that interfaces with a change management database 104. Multiple clients 106 and 110 may interface with the server 102. Client 106 may have a display device 108. Similarly, client 100 may have a display device 112.

In some instances, a client may interface with the server 102 by running an application on a client device. The application may communicate with the server 102 to transfer data to and from the database 104. In such a case, a rendering system 116 may be operable on the client device 110 to analyze change management data and create visual representations of the data.

In other instances, a client may interface with the server 102 by running a thin client, browser, or other architecture whereby the server 102 may perform many of the functions of the overall system. In such an instance, a client device 106 may use a web browser to send and receive information to a change management application that operates on the server 102. Many of the functions of a change management application may be performed on the server 102 in such a case, such as having a rendering system 114 that may create visual representations that are transferred to the client 106 and displayed on the display device 108.

Many different architectures are possible for a change management system. Some systems may have some functions that are performed on a client device while other functions may be performed by a server. In some systems, a single computing device may perform all of the change management functions.

In some embodiments, the server 102 and clients 106 and 110 may be connected by a local area network. In other embodiments, one or both of the clients 106 or 110 may access the server 102 through an internet connection or other wide area network. In some cases, the server 102 may provide a change management service that is accessible through a web browser as a web service.

Figure 2:
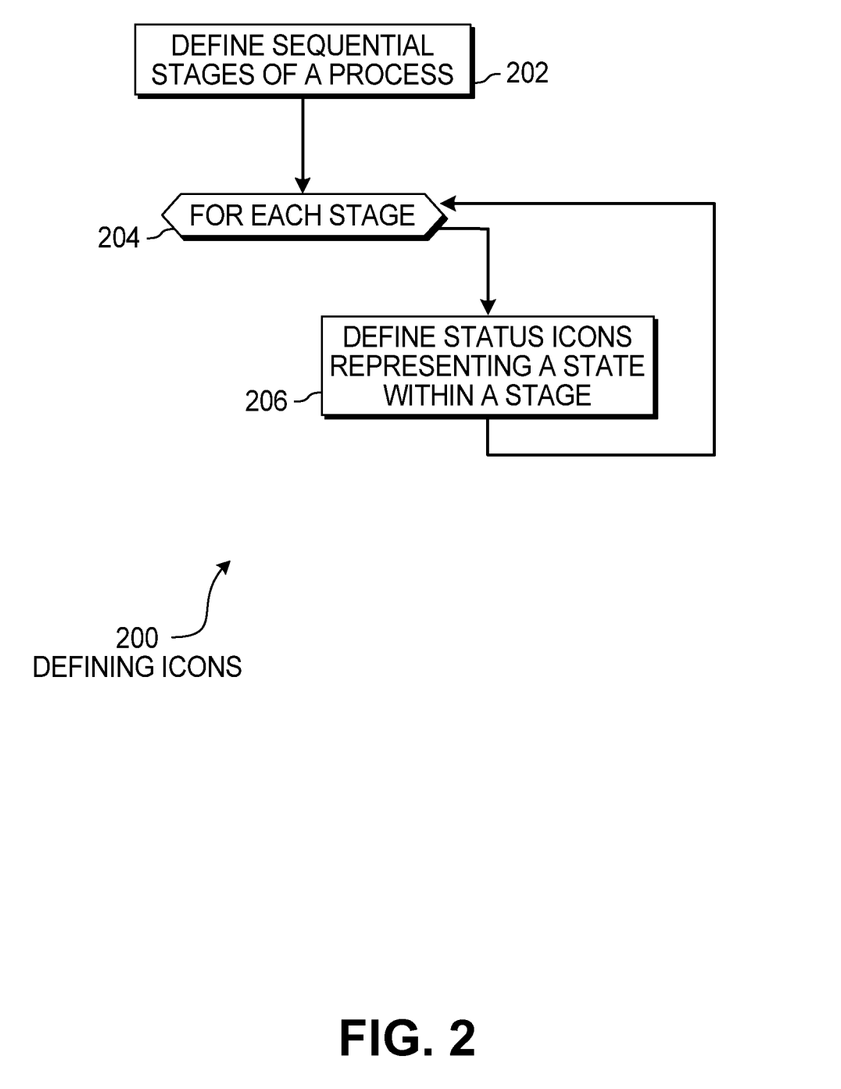
FIG. 2 is a flowchart illustration of an embodiment showing a method for defining icons.

FIG. 2 is a flowchart illustration of an embodiment 200 showing a method for defining icons that may be used in a sequential status icon representation of a change management item.

A set of sequential stages may be defined for a process in block 202. The sequential stages may be any series of phases, stages, or sequence by which a process may be executed. For example, a change request may have stages defined for preliminary activities, approval phase, execution phase, and completion/wrap up phase. Each embodiment may have different definitions of a phase, stage, or sequence by which a process is executed.

The sequential stages may be defined for any process for which a graphical representation may be desired. The processes may be as diverse as a manufacturing process, a business process, a sales process, or any other type of sequential process or method that may be defined in stages.

For each stage in block 204, a status icon may be defined representing a possible status within the stage or phase in block 206. In some cases, the status icon may be designed to represent the current stage and a specific status. For example, a completed status may have a green circle with a check mark over an icon that may represent the stage. A stopped status or halted status may include a stop sign icon. Each stage may have a completed status icon and a not-started status icon, in addition to other status icons that may be defined for appropriate status options for a stage.

Figure 3:
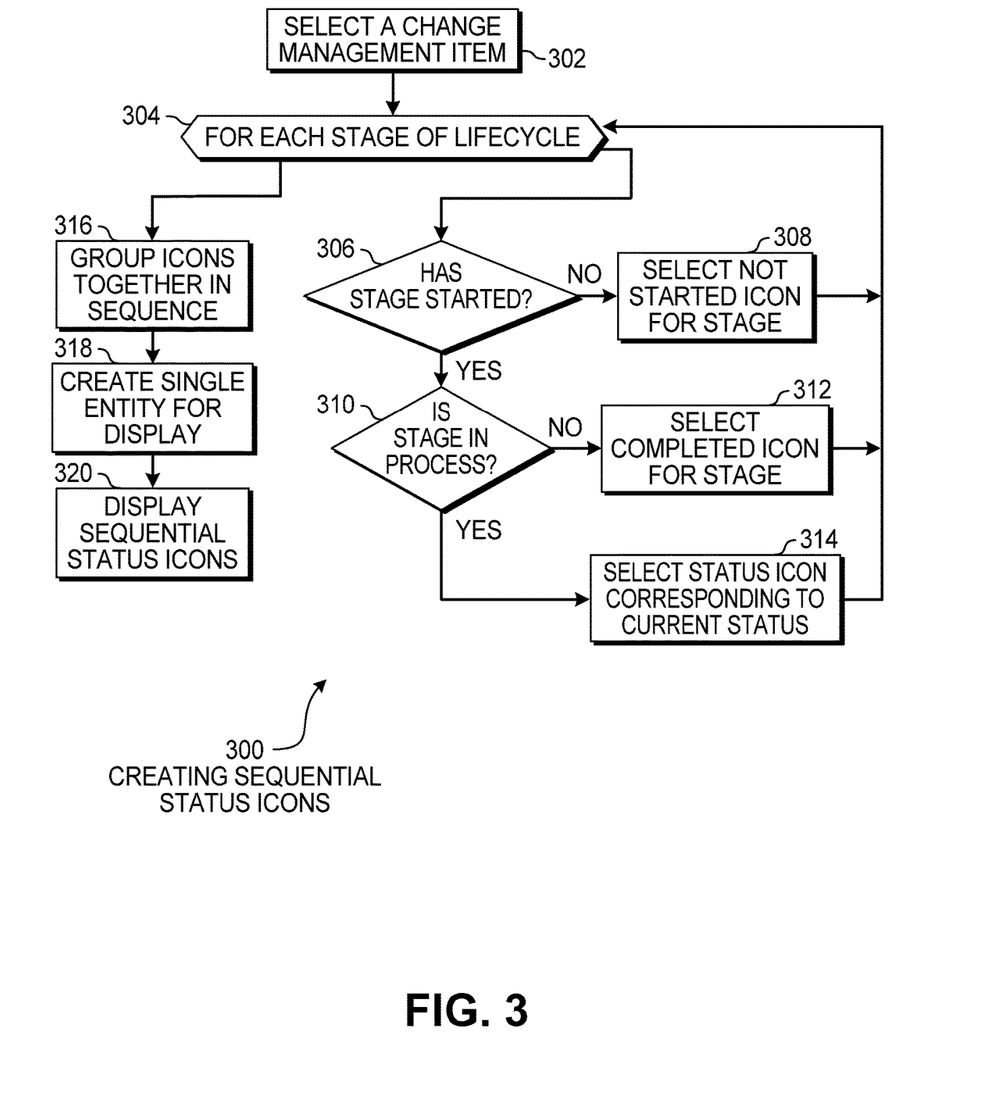
FIG. 3 is a flowchart illustration of an embodiment showing a method for creating sequential status icons for a particular change management item.

FIG. 3 is a flowchart diagram of an embodiment 300 showing a method for creating sequential status icons. Embodiment 300 may be used to create a sequence of status icons that illustrate the current status of an item, such as a change control item.

A change control item is selected in block 302. The change control item may be a change request or other item within a change management system for which a visual status indicator is desired.

For each stage of the lifecycle in block 304 as defined in block 202 above, a status icon may be assigned. If the stage has not started in block 306, the not-started icon may be selected in block 308. If the stage has started in block 306 by is not in process in block 310, a completed icon may be selected in block 312. If the current stage is in process in block 310, a status icon corresponding to the current status is selected in block 314.

The selected status icons may be grouped in block 316 by the overall sequence. A single entity may be created in block 318 with all of the selected icons and displayed in block 320.

Figure 4:
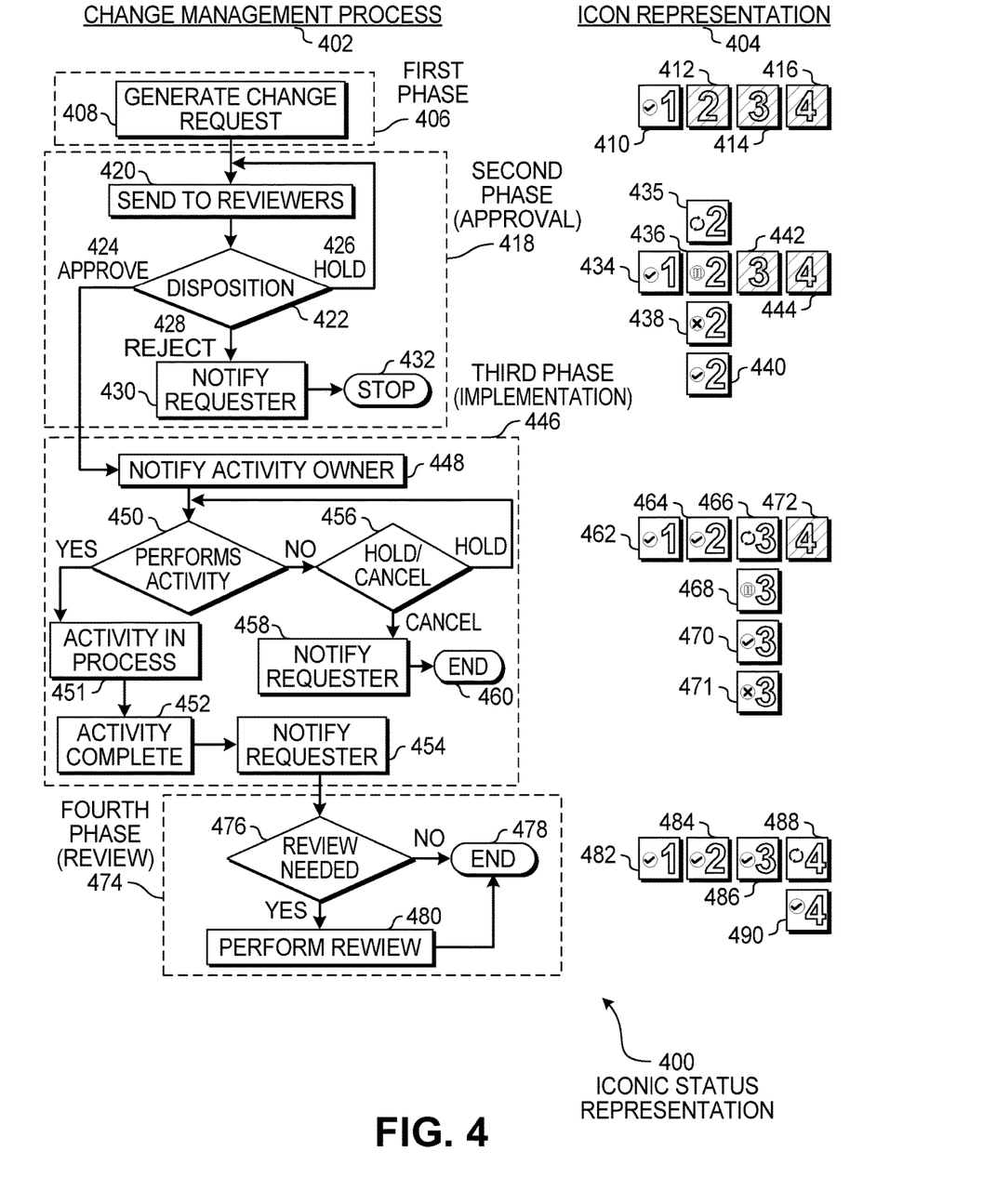
FIG. 4 is a diagram illustration of an embodiment showing a change management process and icons that may be used to illustrate the status during the process.

An example of a representative process and the various status icons is shown in the discussion of FIG. 4.

FIG. 4 is a diagram illustration of an embodiment 400 showing a change management process 402 and corresponding sequential icon representations 404. Embodiment 400 is merely an example of how a sequence may be defined into phases or stages, and icons representing various status situations within the stages may be defined and illustrated.

Embodiment 400 shows a change management process that can be defined in four stages or phases: the first phase 406 is change request generation in block 408. The second phase 418 is an approval phase, while phase three 446 is an implementation phase, and phase four 474 is a review phase.

For each phase, a group of status icons may be defined. When the status icons are properly selected and presented, the current status of a change request may be visually determined. Because an icon is used for each phase of the change request lifecycle, the status may be presented in the context of a timeline for the change request. For example, a status illustrated in the third icon may visually illustrate that the change request has progressed to the third phase, with the icon of the third phase showing the current status.

The first phase 406 may contain a single step, such as generate change request 408. The status icons for this phase may be icons 410, illustrating the first phase with a check mark for completed, as well as icons 412, 414, and 416 representing phases two, three, and four, respectively. Icons 412, 414, and 416 may be 'grayed out' to represent that the phases have not yet been started.

Each embodiment may have different icons or schemes for visually representing a particular phase and the status of the phases. In embodiment 400, icons representing a particular phase may have a number that represents the phase. Other embodiments may have a graphical icon that may represent a particular phase. In some embodiments, the stage icons may be similar or even the same icon, with the represented stage being defined by the position of a particular icon within a sequence of icons.

The second phase 418 may be the approval phase of the change request lifecycle. During the approval phase, the change request may be sent to reviewers in block 420 who may disposition the change request in block 422. The reviewers may approve the change request 424, put the change request on hold 426, or reject the change request 428 and notify the requester in block 430 and stop the process in block 432.

The status options within the second phase 418 may be in review, on hold, approved, or rejected. The icons that may be used to represent status during the second phase may be the completed first phase icon 434, and several status icons for the second phase.

The second phase status icons may include an in process status icon 435, an on-hold status icon 436, a rejected icon 438, and a completed icon 440.

When the second phase status icons are displayed, the not-started icons for the remaining phases may be displayed as icons 442 and 444.

The third phase 446 may be the implementation phase of a change request. The activity owner may be notified in block 448 to perform the task. The activity owner may be the actual person who may perform an action defined in the change request. If the person performs the activity in block 450, the activity is in process in block 451. When the activity is complete in block 452, the requester may be notified in block 454. If the activity owner does not perform the activity in block 450, the person may hold or cancel the activity in block 456. If the activity is cancelled in block 456, the requester is notified in block 458 and the process may end in block 460. Otherwise, the activity may be placed on hold in block 456.

Based on the actions in the third phase 446, the possible status may be in process, on hold, complete, and cancelled. The icons that may be used to represent status during the third phase may be the completed icons 462 and 464 of the first and second phase, respectively, and the various icons representing the status of the third phase.

The third phase status icons may include an in process icon 466, a paused or hold icon 468, a completed icon 470, and a cancelled icon 471.

When the third phase status icons are displayed, the not-started icon 472 representing phase four may be shown.

The fourth phase 474 may be the review phase of a completed change request. If a review is needed in block 476, a review is performed in block 480 and the process may end in block 478. Otherwise, the process may end in block 478.

The possible status of phase four may be in process and completed. The icons representing phase four activities may include completed icons 482, 484, and 486 for the first three phases, as well as an in process icon 488 and a completed icon 490.

Embodiment 400 is merely an example of how a complex lifecycle or process may be defined into phases and the status of the process may be illustrated by a sequence of icons representing the phases.

In many embodiments, the status of an item may be illustrated with several sequential icons. By having a separate icon for each phase, a visual image of the progress through a process may be shown.

Each embodiment may have different manners in which the sequential icons may be displayed. In embodiment 400, the icons may be illustrated in sequence horizontally from left to right. Other embodiments may arrange icons vertically from top to bottom or from bottom to top, or even horizontally from right to left. Still other embodiments may layout the icons on an angle or along a circuitous or tortuous path.

The icons illustrated in embodiment 400 are shown as distinct, separate icons. Some embodiments may graphically join icons together so that they present a single graphical image.

In some embodiments, the various icons may be presented with interactive mechanisms by which a user may perform various actions. For example, a status icon may have a link to a dialog box or other interactive component whereby a user may view related information, edit some underlying data, or perform some other action.

Figure 5:
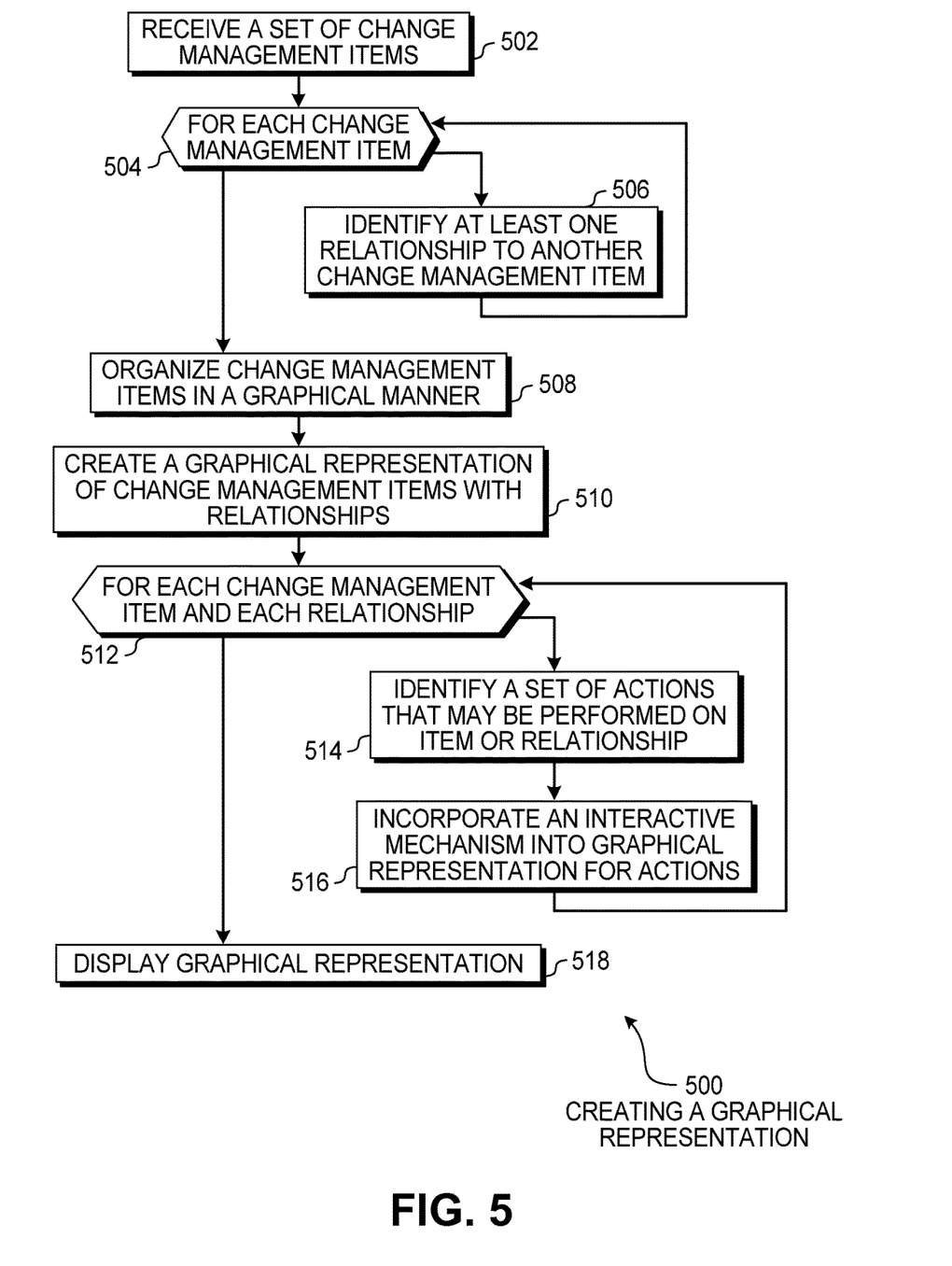
FIG. 5 is a flowchart illustration of an embodiment showing a method for creating a graphical representation of change management items.

FIG. 5 is a flowchart illustration of an embodiment 500 illustrating the creating of a graphical representation of several related change requests. Embodiment 500 is another example of visual expressions of change requests, with the emphasis on illustrating the relationships between change requests.

In many embodiments, a change request for a complex or sometimes a simple change may have ripple effects with other managed assets or related items within the change management system. In such a situation, additional change requests may be created to address the changes to the related assets. The additional change requests may be liked by relationships.

Change requests may be defined with many different types of relationships. A sequential dependent relationship may define one change request that may be implemented after a first change request is completed. A parallel relationship may define two or more change requests that may be performed in parallel.

Some embodiments may have parent/child relationships or other hierarchical types of relationships. Some parent/child relationships may include a series of child change requests that make up a parent change request. In such cases, the status of the parent change request may roll up the status of the various child change requests.

Some relationships may be defined as one-way relationships where a second change request may be dependent on a first change request, or as a two-way relationship where each change request is dependent on a portion of the other.

Each embodiment may have different manners of defining relationships and such relationships may have different functions or operate in various ways. The relationships discussed in this specification are merely examples of some of the ways relationships may be defined and used.

A set of change management items may be received in block 502. The change management items may include change requests as well as other items such as assets, personnel, or other items that may be displayed.

For each change management item in block 504, at least one relationship may be identified in block 506 between the current item and another item.

After identifying the existing relationships, the change management items may be arranged in a graphical manner in block 508, and a graphical representation of the change management items with the relationships may be created in block 510.

For each change management item and each relationship in block 512, a set of actions that may be performed on the item or relationship may be identified in block 514 and an interactive mechanism may be incorporated into the graphical representation in block 516.

The graphical representation is displayed in block 518.

Embodiment 500 illustrates a method for composing an interactive diagram that may show various change management items and the relationships between the items. Within the graphical representation, various interactive features may be placed so that a user may interact with the various illustrated components and relationships between the components.

Figure 6:
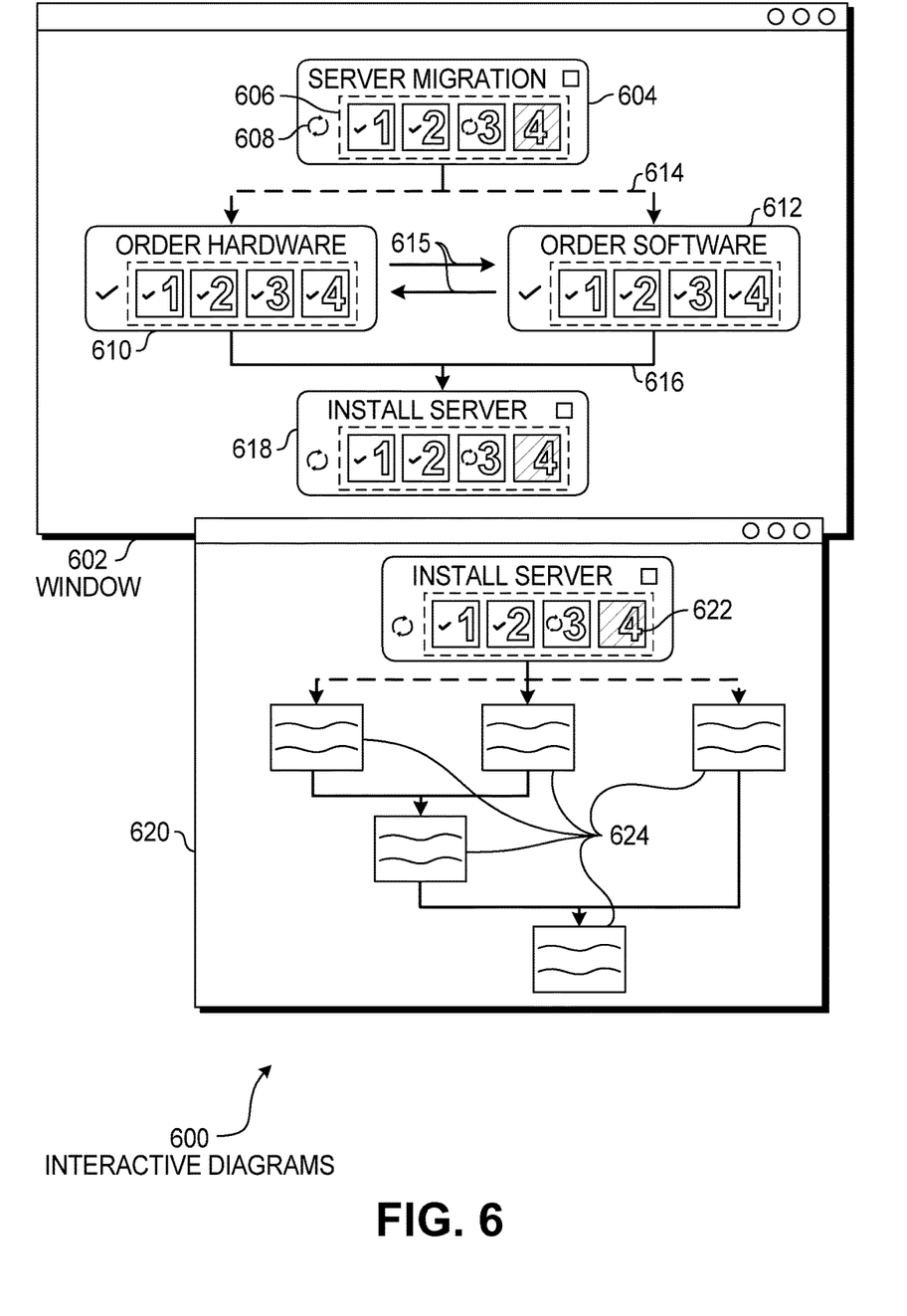
FIG. 6 is a diagram illustration of an embodiment showing a graphical representation of several change management items.

FIG. 6 is a diagram illustration of an embodiment 600 showing interactive diagrams. Embodiment 600 is an example of how change orders or other items may be displayed using relationships. Other embodiments may use different features, layout techniques, indicators, buttons, graphical elements, or other devices to illustrate change management items and the relationships between the items.

In window 602, several change orders are illustrated. A first change order 604 is illustrated with a set of sequential status icons 606 and a current status icon 608.

In the embodiment, the first change order 604 may be a parent change order that may include child change orders 610, 612, and 618. In this embodiment, a parent change order may act as an aggregation of one or more child change orders. Because of the parent/child relationship, the icons 606 and 608 may illustrate the aggregated status of the various child change requests.

The parent/child relationship may be illustrated by the dashed line 614. Some embodiments may illustrate different types of relationships by differing line weights, colors, line types, and other graphical elements.

Relationship 615 may indicate a two-way dependency between change requests 610 and 612. The two-way dependency 615 may be defined in a manner that portions of change request 610 depend on portions of change request 612 and vice versa.

Change request 618 may have a sequential dependency on both change requests 610 and 612, as illustrated by solid line 616.

Change request 618 may be a parent change request to several other change requests as shown in window 620. The window shows a parent change request 622 and several child change requests 624.

The embodiment 600 may have several interactive features built into the display. In some cases, a hot zone or other area may be defined over a change request, an icon within a change request, a relationship, or other areas around the windows 602 and 620 where a cursor may be used to interact with an item. In some cases, a mouse-over action, selecting action, right-click action, or any other interaction may trigger a menu of available actions or other interactive feature.

The interactive features may allow a user to perform many different functions of a change management application directly from the interactive interface of windows 602 or 620.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method for user at a computer device, the computer device including a display device, the method comprising:
    for a stage associated with a multi-stage change management item, the computer device changing the format of data representing the stage by supplementing the format of data representing the stage, including:
        the computer device assigning a stage identifier icon for the stage; and
        the computer device defining one or more additional status icons displayable along with the stage identifier icon for the stage, each of the one or more additional icons for visually indicating a corresponding additional status for the stage when the stage is the current state in the multi-stage process;
    the computer device communicating with a change management database to access change management data for the multi-stage change management item;
    the computer device analyzing the change management data corresponding to the multi-stage change management item to:
        identify the stage as the current stage associated with the multi-stage change management item; and
        identify a current status for the stage;
    the computer device creating a composite graphical element having independently selectable functions associated with the composite graphical element, the composite graphical element defining a set of stage identifier icon and status icon combinations, each stage identifier icon representing the state of the multi-stage change management item for the stage and indicating an independently selectable function of associated computer-executable analytics for interacting with the multi-stage change management item at the display device, including:
        a status icon to assign the identified current status for the stage to the stage identifier icon;
        a completed icon to assign to the stage identifier icon when the stage is completed; and
        a not yet started icon to assign to the stage identifier icon when the stage has yet to be started; and
    the computer device initiating computer-executable analytics associated with an indicated independently selected function for a stage identifier icon in response to user interaction with the stage identifier icon through the composite graphical element.

2. The method of claim 1, wherein creating a composite graphical element having independently selectable functions associated with the composite graphical element comprises creating a composite graphical element for implementing a software upgrade change process.

3. The method of claim 1, further comprising:
    identifying at least one selectable function for the set of stage identifier icon and status icon combinations; and
    providing a mechanism by which a user may perform an activity associated with the selectable function by interacting with the set of stage identifier icon and status icon combinations.

4. The method of claim 1, further comprising presenting the independently selectable functions as selectable at the display device via the composite graphical element.

5. The method of claim 1, wherein defining one or more additional status icons displayable along with the stage identifier icon for the stage comprises defining: an in process status icon, an on-hold status icon, and a rejected icon.

6. The method of claim 1, the multi-state change management item comprising a change request.

7. The method of claim 1, the multi-state change management item comprising a relationship.

8. The method of claim 7, the relationship comprising at least one from a group consisting of:
    a sequential dependency;
    a parallel dependency;
    a parent child dependency; and
    a hierarchical dependency.

9. A system comprising:
    a display device;
    one or more hardware processors;
    system memory coupled to the one or more hardware processors, the system memory storing instructions that are executable by the one or more hardware processors;
    the one or more hardware processors executing the instructions stored in the system memory to:
        for a stage associated with a multi-stage change management item stored in a change management database, change the format of data representing the stage by supplementing the format of data representing the stage, including:
            assign a stage identifier icon for the stage; and
            define one or more additional status icons displayable along with the stage identifier icon for the stage, each of the one or more additional icons for visually indicating a corresponding additional status for the stage when the stage is the current state in the multi-stage process;
        communicate with the change management database to access change management data for the multi-stage change management item;
        analyze change management data corresponding to the multi-stage change management item to:
            identify the stage as the current stage associated with the multi-stage change management item; and
            identify a current status for the stage;
        create a composite graphical element having independently selectable functions associated with the composite graphical element, the composite graphical element defining a set of stage identifier icon and status icon combinations, each stage identifier icon representing the state of the multi-stage change management item for the stage and indicating an independently selectable function of associated computer-executable analytics for interacting with the multi-stage change management item, including:
            a status icon to assign the identified current status for the stage to the stage identifier icon;

a completed icon to assign to the stage identifier icon when the stage is completed; and a not yet started icon to assign to the stage identifier icon when the stage has yet to be started; and initiate computer-executable analytics associated with an indicated independently selected function for a stage identifier icon in response to user interaction with the stage identifier icon through the composite graphical element.

10. The system of claim 9, further comprising the one or more hardware processors executing the instructions stored in the system memory to:

display the set of stage identifier icon and status icon combinations;

identify an independently selectable function relating to the multi-stage change management item; and provide an interactive mechanism by which a user may perform an action associated with the independently selectable function by interacting with a portion of the set of stage identifier icon and status icon combinations.

11. The system of claim 9, the multi-state change management item comprising a change request.

12. The system of claim 9, the multi-state change management item comprising a relationship.

13. The system of claim 12, the relationship comprising at least one from a group composed of:
a sequential dependency;
a parallel dependency;
a parent/child dependency; and
a hierarchical dependency.

14. A computer system, the computer system comprising:
a display device;
a processor;
system memory coupled to the processor and storing instructions configured to cause the processor to:
for a stage associated with a multi-stage change management item of a software upgrade change management process, change the format of data representing the stage by supplementing the format of data representing the stage including:
assign a stage identifier icon for the stage; and
define one or more additional status icons displayable along with the stage identifier icon for the stage, each of the one or more additional icons for visually indicating a corresponding additional status for the stage when the stage is the current state in the software upgrade change management process;
communicate with a change management database to access change management data for the multi-stage change management item;
analyze change the management data corresponding to the multi-stage change management item to:

identify the stage as the current stage associated with the multi-stage change management item; and identify a current status for the stage;

create a composite graphical element having independently selectable functions associated with the composite graphical element, the composite graphical element defining a set of stage identifier icon and status icon combinations, each stage identifier icon representing the state of the multi-stage change management item for the stage and indicating an independently selectable function of associated computer-executable analytics for interacting with the multi-stage change management item at the display device, including:

a status icon to assign the identified current status for the stage to the stage identifier icon;

a completed icon to assign to the stage identifier icon when the stage is completed; and a not yet started icon to assign to the stage identifier icon when the stage has yet to be started; and initiate computer-executable analytics associated with an indicated independently selected function for a stage identifier icon in response to user interaction with the stage identifier icon through the composite graphical element.

15. The computer system of claim 14, further comprising instructions configured to group the set of stage identifier icon and status icon combinations into-the composite graphical element.

16. The computer system of claim 14, further comprising instructions configured to:

identify at least one selectable function for the set of stage identifier icon and status icon combinations; and provide a mechanism by which a user may perform an activity associated with the selectable function by interacting with the set of stage identifier icon and status icon combinations using a pointing device.

17. The computer system of claim 14, wherein the instructions configured to define one or more additional status icons displayable along with the stage identifier icon for the stage comprise instructions configured to define: an in process status icon, an on-hold status icon, and a rejected icon.

18. The computer system of claim 14, the multi-state change management item comprising a change request.

19. The computer system of claim 14, the multi-state change management item comprising a relationship.

20. The computer system of claim 19, the relationship comprising at least one from a group composed of:
a sequential dependency;
a parallel dependency;
a parent/child dependency; and
a hierarchical dependency.

* * * * *